United States Patent
Choi et al.

[11] Patent Number: 6,162,893
[45] Date of Patent: Dec. 19, 2000

[54] SOLUBLE POLYIMIDE RESIN HAVING A DIALKYL SUBSTITUENT FOR A LIQUID CRYSTAL ALIGNMENT LAYER, THE MONOMERS AND MANUFACTURING METHODS THEREOF

[75] Inventors: Kil-Yeong Choi; Mi-Hie Yi; Moon-Young Jin, all of Daejeon; Jin-Tae Jung, Seoul; Jae-Geun Park, Daejeon; Dae-Woo Ihm, Seoul, all of Rep. of Korea

[73] Assignee: Korea Research Institute of Chemical Technology, Rep. of Korea

[21] Appl. No.: 09/138,377

[22] Filed: Aug. 24, 1998

[30] Foreign Application Priority Data

Aug. 22, 1997 [KR] Rep. of Korea ........................ 97-40257

[51] Int. Cl.$^7$ .................................................. A61K 38/17
[52] U.S. Cl. ............................................................. 528/353
[58] Field of Search ............................................... 528/353

[56] References Cited

U.S. PATENT DOCUMENTS

| | | | |
|---|---|---|---|
| 5,521,276 | 5/1996 | Coi et al. .................. | 528/322 |
| 5,610,265 | 3/1997 | Tan .......................... | 528/353 |
| 5,614,606 | 3/1997 | Chaudhari et al. ....... | 528/353 |
| 5,686,558 | 11/1997 | Kitamura et al. ........ | 528/353 |
| 5,731,404 | 3/1998 | Auman et al. ........... | 528/353 |
| 5,783,656 | 7/1998 | Kimura et al. ........... | 528/353 |
| 5,807,961 | 9/1998 | Sawai et al. ............. | 528/170 |
| 6,013,760 | 1/2000 | Choi et al. ............... | 528/353 |
| 6,031,067 | 2/2000 | Choi et al. ............... | 528/353 |

OTHER PUBLICATIONS

Kusama, et al., Soluble Polyimides with Polyalicyclic Structure. 3.1 Polyimides from (rarH, 8ac–dimethanonaphthalene–2t, 3t, 5c–tetracarboxylic 2,3:6, 7–Dianhydride, *Macromolecules* 27:1117–1123 (1994).

Yamada et al., Soluble Polyimides with Polyalicyclic Structure. 1.1 Polyimides from Bicyclo[2.2.1] heptane–2–exo–3–exo–5–exo–6–exo–teracarboxylic 2,3:5, 6–Dianhydride, *Macromolecules* 26:4961–4963 (1993).

Q. Jin, et al., Polyimides with Alicyclic Diamines. I. Syntheses and Thermal Properties, J.P.S. Part A. Polym. , vol. 21, 2345–2351 (1993).

*Primary Examiner*—Kriellion Sanders
*Attorney, Agent, or Firm*—Finnegan, Henderson, Farabow, Garrett & Dunner

[57] ABSTRACT

The invention herein relates to a soluble polyimide resin having a dialkyl substituent for a liquid alignment layer, wherein aliphatic tetracarboxylic dianhydride and aromatic diamine having a dialkyl substituent are used to yield said soluble polyimide resin which has superior heat-resistance, solubility, transparency, and liquid crystal alignment capacity. According to the present invention, the soluble polyimide polymer having a dialkyl substituent, for a liquid crystal alignment layer, comprising the following a repetitive unit of formula 1:

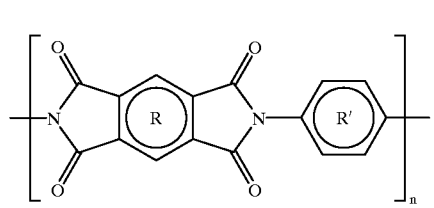

Consequently, the polyimide resin under the present invention not only has superior heat-resistance but also excellent solubility and transparency, which could be applicable as a liquid crystal alignment layer for the TFT-LCD requiring a low temperature processing. Further, the invention has the effects of providing a polyimide resin with superior physical property for heat-resistance structural material, and the monomer therein, in addition to the manufacturing methods thereof.

19 Claims, 1 Drawing Sheet

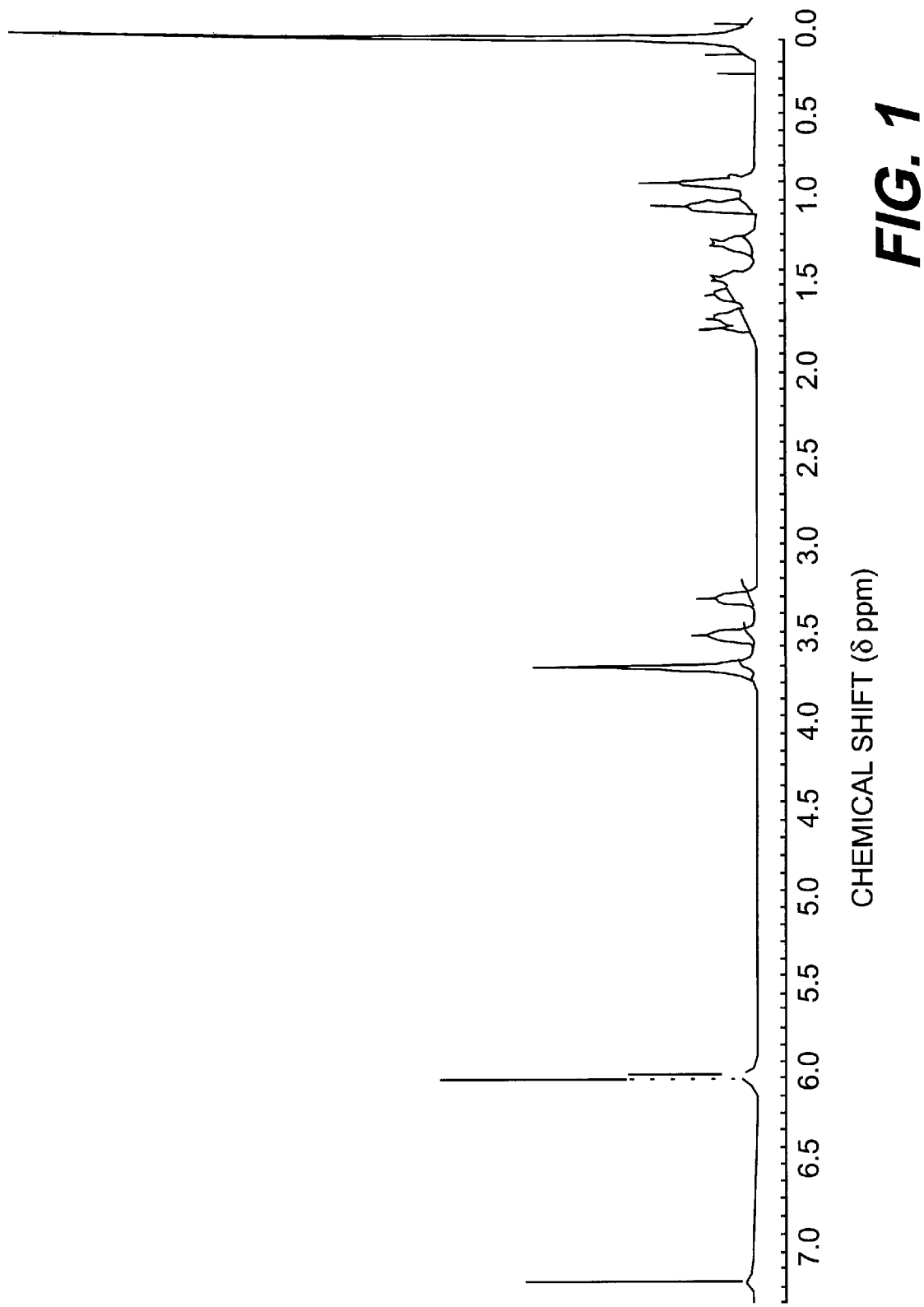

SOLUBLE POLYIMIDE RESIN HAVING A DIALKYL SUBSTITUENT FOR A LIQUID CRYSTAL ALIGNMENT LAYER, THE MONOMERS AND MANUFACTURING METHODS THEREOF

FIELD OF THE INVENTION

The invention herein relates to a soluble polyimide resin having a dialkyl substituent for a liquid crystal alignment layer, wherein aliphatic tetracarboxylic dianhydride and aromatic diamine having a dialkyl substituent are used to yield a soluble polyimide resin which has superior heat-resistance, solubility, transparency and liquid crystal alignment capacity.

BACKGROUND OF THE INVENTION

In general, a polyimide resin refers to a resin having an imide group in the backbone, which is a high heat-resistant resin manufactured by condensation polymerization of aromatic tetracarboxylic acid or the derivatives thereof with aromatic diamine, or aromatic diisocyanate followed by imidization. The resin is widely used in film, print panel, electric wire enamel, etc.

Further, the polyimide resin can have a variety of molecular structures depending on the types of the monomers therein. As for the aromatic tetracarboxylic acid constituent, pyromellitic dianhydride (PMDA) or biphenyltetracarboxylic dianhydride (BPDA) is used. As for the aromatic diamine constituent, oxydianiline (ODA) or p-phenylene diamine (p-PDA) is used for condensation polymerization. The typical polyimide resin has a repetitive unit of the following formula 1:

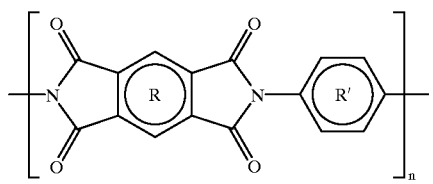

(1)

The polyimide resin with the formula 1 as a repetitive unit is high heat-resistant, insoluble, and non-meltable with the following properties:

(1) excellent thermo-oxidative property;

(2) superior heat-resistance based on the utilization at high temperature, i.e., 260° C. for a long-term use, and 480° C. for a short-term use;

(3) excellent electrochemical and mechanical properties;

(4) excellent radiation resistance and low temperature properties;

(5) intrinsic non-combustible properties; and (6) excellent chemical-resistant properties.

In spite of the fact that the polyimide resin with formula 1 as repetitive unit possesses an excellent heat resistance property, the processing therein is extremely difficult due to insolubility and non-melting property.

To overcome the shortcoming of the polyimide resin, several methods have been devised: a) method of introducing polar groups into the backbone or side chains of the polymer, b) method of introducing the connecting group or bulky pendant groups into the polymer, and c) method of enhancing the flexibility of the backbone of the polymer.

In particular, as part of research to enhance the solubility of the polyimide resin, T. Kurosaki et al. discloses a method of preparing a soluble polyimide using alicyclic anhydride as a monomer (Macromolecules, 1994, 27, 1117 and 1993, 26, 4961). Also, Qn Jin et al. discloses a method of preparing a soluble polyimide resin using the cyclic diamine (J.P.S. Part A. Polym. Chem. Ed., 31, 2345~2351).

In the present invention, the mixture of dioxotetrahydrofuryl 3-methylcyclohexene-1,2-dicarboxylic dianhydride (DOCDA), which is an alicyclic dianydride, and aromatic tetracarboxylic dianhydride, in addition to aromatic diimine compound were used to prepare a novel soluble polyimide having excellent heat-resistance, transparency and liquid crystal alignment capacity.

As such, the objectives of the invention herein lies in providing a soluble polyimide resin having a dialkyl substituent for a liquid crystal alignment and the monomer thereof; which has superior heat-resistance, transparency and liquid crystal alignment capacity. Further, the objective of the invention includes the manufacturing method of the same.

DETAILED DESCRIPTION OF PREFERRED EMBODIMENTS

In order to achieve the objective of the present invention, the diimine monomer for manufacturing a soluble polyimide resin having a dialkyl substituent for the liquid crystal layer has the following formula 2:

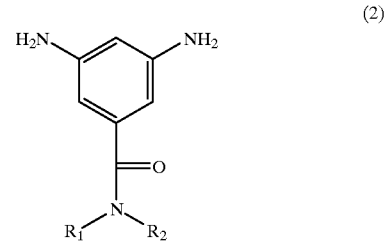

(2)

wherein $R_1$ and $R_2$ are alkyl groups having 4 to 18 carbon atoms.

Further, according to the present invention, the polyimide resin having a dialkyl substituent for the liquid crystal layer comprises a repetitive unit represented by the following formula 1:

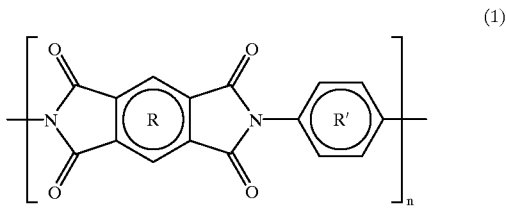

(1)

wherein

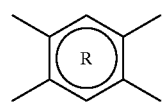

is one or more tetravalent groups selected from the following:

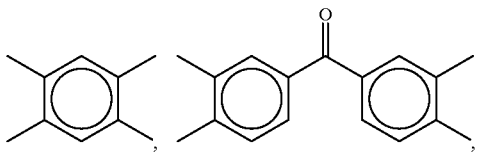
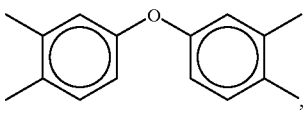
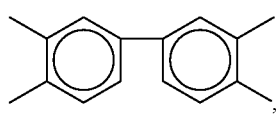
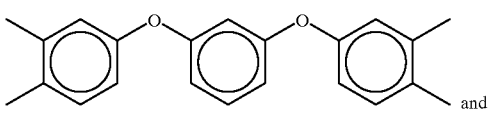
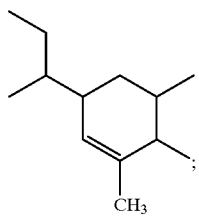 and
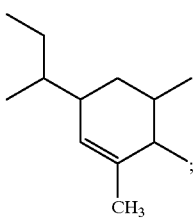

but must include the group of the following formula 3:

(3)

is one or more travalent groups selected from the following:

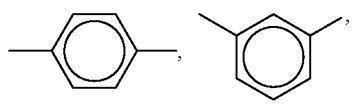
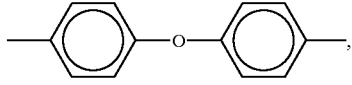
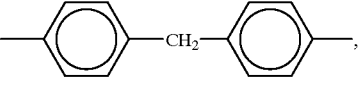
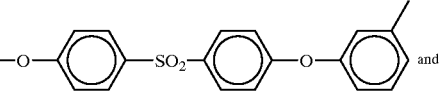
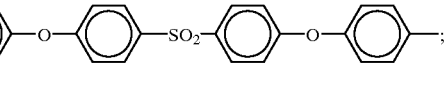 and
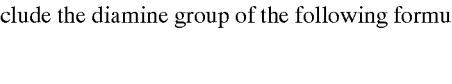;

but must include the diamine group of the following formula 2:

(2)

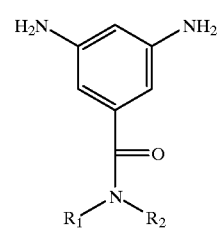

wherein $R^1$ and $R^2$ represent alkyl groups having 4 to 18 carbon atoms.

Further, according to the present invention, with respect to the manufacturing method of a polyimide resin by means of a solution polymerizaton of diamine and tetracarboxylic dianhydride, the diamine therein comprises one or more of the group consisting of diamine of formula 2, oxydianiline, methylene dianiline, metabisaminophenoxy diphenylsulfone, and parabisaminophenoxy diphenylsulfone but must have diamine of formula 2. As for tetracarboxylic dianhydride, it is one or more of dianhydride selected from group consisting of pyromellitic dianhydride (PMDA), benzophenonetetraboxylic dianhydride (BTDA), oxydiphthalic dianhydride (ODPA), biphenyltetracarboxylic dianhydride (BPDA), hexafluoroisopropylidene diphthalic dianhydride (HFDA), and dioxotetrahydrofuryl 3-methylcyclohexene-1,2-dicarboxylic dianhydride (formula 3). The manufacturing method of the soluble polyimide resin comprises the preparation of the reactant mixtures, in which said anhydride is dissolved in a solvent; the primary heating step, in which said reactant mixture from the first step is heated at 60~80° C. for 1~5 hours; the reflux step in which the heated reactant mixture is refluxed at the reflux temperature of the solvent for 6 to 12 hours; the precipitation step in which the products from the reaction is precipitated in the excess water-soluble solvent after the termination of the reactions by reflux; and the post-process step in which the precipitates are dried under reduced pressure.

The invention herein is explained in more detail as set forth hereunder. The invention herein relates to a soluble polyimide resin having a dialkyl substituent for a liquid crystal alignment layer, comprising a repetitive unit of the following formula 1:

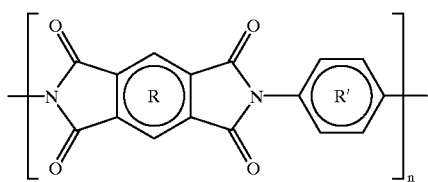
(1)

wherein

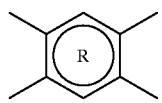

is one or more tetravalenet group selected from the following:

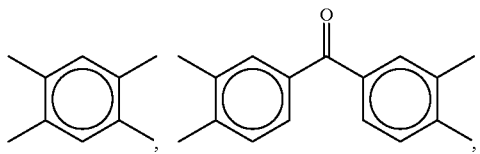

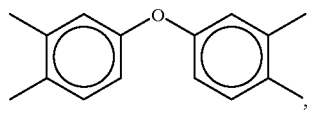

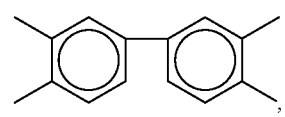

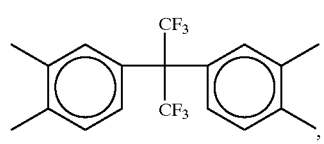

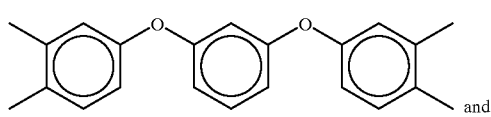

and

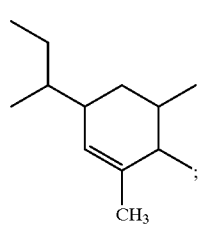

but must include the group of the following formula 3:

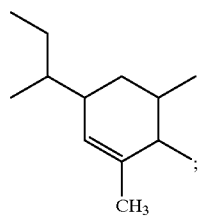
(3)

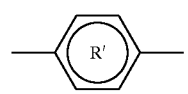

is one or more tetravalent groups selected from the following:

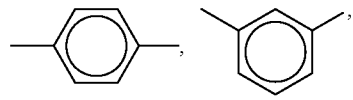,

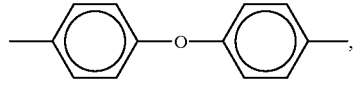,

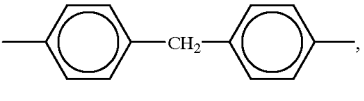,

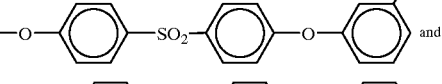 and

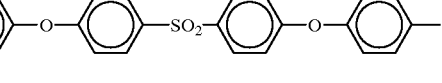;

but must include the diamine group of the following formula 2:

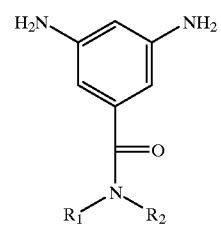
(2)

wherein, $R^1$ and $R^2$ represent alkyl groups having 4 to 18 carbon atoms.

The polyimide resin with the above structure according to the present invention has superior heat resistance, transparency and liquid crystal alignment capacity.

Further, the polyimide resin of the invention herein has a weight average molecular weight (MW) of about 50,000~150,000 g/mol. The inherent viscosity thereof is in the range of 0.5~2.0 dL/g. The glass transition temperature (Tg) thereof is in the range of 250~400° C., and the pretilt angle is in the range of 5 and 15°.

Particularly, the polyimide resin under said invention is easily dissolvable at room temperature in aprotic polar or organic solvents such as solvents selected from the mixtures consisting of two or more of dimethylacetamide (DMAC), dimethylformamide (DMF), N-methyl-2-pyrrolidone (NMP), tetrahydrofuran (THF), chloroform acetone, ethyl acetate, and m-cresol. Consequently, the resin can be easily fabricated into other forms, e.g., films. The above polyimide resin has the advantage of superior processiblity due to high solubility in common organic solvents with low boiling point such as tetrahydrofuran (THF) and chloroform, and in less hygroscopic solvent such as γ-butyrolactone.

Further, according to the present invention, with respect to the manufacturing method of a polyimide resin by means of a solution polymerization of diamine and tetracarboxylic dianhydride, the diamine therein comprises one or more of the group consisting of diamine of formula 2, oxydianiline, methylene dianiline, metabisaminophenoxy diphenylsulfone, and parabisaminophenoxy diphenylsulfone but must have diamine of formula 2. As for tetracarboxylic dianhydride, it is one or more of dianhydride selected from group consisting of pyromellitic dianhydride (PMDA), benzophenonetetraboxylic dianhydride (BTDA), oxydiphthalic dianhydride (ODPA), biphenyltetracarboxylic dianhydride (BPDA), hexafluorisopropylidene diphthalic dianhydride (HFDA), and dioxotetrahydrofuryl 3-methylcyclohexene-1,2-dicarboxylic dianhydride (formula 3). The manufacturing method of the soluble polyimide resin comprises the preparation of the reactant mixtures, in which said anhydride is dissolved in a solvent; the primary heating step, in which said reactant mixture from the first step is heated at 60~80° C. for 1~5 hours; the reflux step in which the heated reactant mixture is refluxed at the reflux temperature of the solvent for 6 to 12 hours; the precipitation step in which the products from the reaction is precipitated in the excess water-soluble solvent after the termination of the reactions by reflux; and the post-process step in which the precipitates are placed under reduced pressure and dried.

The reaction solvent such as m-cresol may be used in said preparation step of the reactant mixtures. Particularly, the diamine of formula 2 in the solid phase in the solid content range of 10 to 30 wt % may be added thereto.

As from the reflux step, the imidization catalyst such as quilonine or the derivatives thereof may be added in the rage of 1 to 5 wt % to the total amount of said reaction mixture.

The following examples illustrate various aspects of the invention herein but are not to be construed to limit the claims in any manner whatsoever.

EXAMPLE 1

Preparation of di-nitro-di-(n-butyl)-benzamide (hereinafter DN-L-4DM)

To a 50 ml reactor equipped with an agitator and nitrogen-inlet, nitrogen gas was slowly influxed as di-(n-butyl)amine (1.29g, 0.01 mole) was dissolved in 5 ml of the reacting solvent of dimethylacetamide. While influxing nitrogen gas, 3,5-dinitrobenzyl chloride (2.30 g, 0.01 mole) in the solid phase was slowly added. After the reaction, the mixture was precipitated in excess distilled water. Thereafter, the solid material so filtered was washed with sodium bicarbonate and diluted hydrochloric acid solutions for more than three times, after which was dried under reduced pressure at 60° C. Using the process as set forth above, the DN-L-4DM was obtained with the reaction yield of 91%. The above process was carried out with changing the number of carbon atom in the alkyl group by means of substituting di-(n-butyl)amine with di-(n-hexyl)amine, di-(n-octyl)amine, di-(n-decyl) amine, di-(n-dodecyl)amine, di-(n-tetradecyl)amine, di-(n-hexadecylamine) or di-(n-octyldecyl)amine

EXAMPLE 2

Preparation of diamino-di-(n-butyl)-benzamide (hereinafter DA-L-4DM)

DN-L-4DM (12.9 g, 0.04 mole) was dissolved in 200 ml of ethanol, after which was placed in hydrogenator along with 2.0 g of 5% Pd/C (catalyst for hydrogenation, in which the surface of the carbon powder has been coated at 5% with palladium metal). As such, the reduction reaction was carried out at 40° C. for 3 hours. After filtering of the reaction mixture, the solvent was removed by distilling under reduced pressure. The mixture was re-crystallized under ethyl acetate/hexane co-solvent to yield DA-L-4DM with the reaction yield of 96.0%. The $^1$H-NMR spectrum of DA-L-4DM is shown in FIG. 1. The above process was carried out with changing the number of carbon atom in the alkyl group by means of substituting DN-L-4DM with DN-L-6DM, DN-L-8DM, DN-L-10DM, DN-L-12DM, DN-L-14DM, DN-L-16DM or DN-L-18DM.

The yields based on the number of carbon atom in the alkyl group were 89.0% for DN-L-6DM, 82.0% for DN-L-8DM, 80.7% for DN-L-10DM, 82.0% for DN-L-12DM, 85.4% for DN-L-14DM, 80.9% for DN-L-16DM or 81.0% for DN-L-18DM, respectively.

EXAMPLE 3

To a 50 ml reactor equipped with an agitator, thermometer, nitrogen-inlet, dropping funnel and condenser, nitrogen gas was slowly influxed as p-phenylene diamine (p-PDA: 9.72 g, 0.09 mole) and DA-L-4DM (2.63 g, 0.01 mole) as diamine were dissolved in the reaction solvent of m-cresol. Thereafter, while influxing the nitrogen gas, dioxotetrahydrofuryl 3-methylcyclohexene-1,2-dicarboxylic dianhydride (DOCDA: 26.4 g, 0.1 mole) in a solid phase was slowly added therein with the solid content of 15 wt %. The reaction temperature was raised to 70° C., after which the reaction was carried out for 2 hours. The temperature was successively raised to the reflux temperature, after which the mixture was stirred for 6 hours. As an imidization catalyst, isoquinoline (3 wt %) was used. After the reaction, the mixture was washed using the Waring blender in excess methanol for more than three times. Then, the filtered polymer was dried under reduced pressure at 120° C. to yield a novel polyimide resin. The yield of polymerization was quantitative in nature. The inherent viscosity measured at 30° C. at the concentration of 0.5 g/dL was 0.85 dL/g in the presence of m-cresol as a solvent.

Further, as for the yielded polyimide resin, the glass transition temperature measured by differential scanning calorimeter (DSC), the result of which is shown in Table 1.

The polyimide solution in γ-butyrolactone had been spin-coated onto ITO glass at 400~4000 rpm for 25 seconds. The obtained polyimide thin layer was rubbed with Nylon cloth, and then the characteristics of the liquid crystal cell was duly confirmed. The alignment property of liquid crystals were examined by a microscope with cross-polarizer, and the pretilt angles were measured by the crystal rotation method, the results of which are shown in Table 1.

EXAMPLE 4

The same method in Example 3 was carried out except for the use of 3.79 g of DA-L-6DM (0.01 mol), and the inherent viscosity of the yielded polyimide resin was 0.80 dL/g.

EXAMPLE 5

The same method as in Example 3 was carried out except for the use of 4.35 g of DA-L-8DM (0.01 mol), and the inherent viscosity of the yielded polyimide resin was

EXAMPLE 6

The same method as in Example 3 was carried out except for the use of 4.91 g of DA-L-10DM (0.01 mol), and the inherent viscosity of the yielded polyimide resin was 0.79 dL/g.

EXAMPLE 7

The same method as in Example 3 was carried out except for the use of 5.47 g of DA-L-12DM (0.01 mol), and the inherent viscosity of the yielded polyimide resin was 0.75 dL/g.

EXAMPLE 8

The same method as in Example 3 was carried out except for the use of 6.03 g of DA-L-14DM (0.01 mol), and the inherent viscosity of the yielded polyimide resin was 0.75 dL/g.

EXAMPLE 9

The same method as in Example 3 was carried out except for the use of 6.59 g of DA-L-16DM (0.01 mol), and the inherent viscosity of the yielded polyimide resin was 0.71 dL/g.

EXAMPLE 10

The same method as in Example 3 was carried out except for the use of 7.15 g of DA-L-18DM (0.01 mol), and the inherent viscosity of the yielded polyimide resin was 0.72 dL/g.

COMPARATIVE EXAMPLE

The same method as in Example 3 was carried out except for the use of 1.08 g of p-PDA (0.01 mol) and 2.64 g of DOCDA (0.01 mol), and the inherent viscosity of the yielded polyimide resin was 1.30 dL/g, which was measured at a temperature of 30° C. by dissolving the same in dimethylacetamide at the concentration of 0.5 g/dL.

As for the diamines manufactured as monomers in Examples 1 and 2, the yields after the recrystallization of the diamine monomers containing two long alkyl side chains which were connected to the amide group were determined to be more than 80%.

The structure of the DA-L-4DM, which was prepared as a monomer in Example 2, was confirmed by NMR Spectroscopy, and the $^1$H-NMR spectrum therefrom is shown in FIG. 1.

Further, the physical properties including molecular weight of the yielded polyimide resin from Example 3~8 and Comparative Example are shown in Table 1.

TABLE 1

Physical Properties of Polyimide Resins

| Resins | Inherent Viscosity (dL/g) | Glass Transition Temperature (° C.) | Film Property | Liquid Crystal Alignment Capacity | Pretilt Angle (°) |
|---|---|---|---|---|---|
| Example 3 | 0.85 | 334 | Tough | Good | 6.7 |
| Example 4 | 0.80 | 325 | Tough | Good | 8.7 |
| Example 5 | 0.78 | 328 | Tough | Good | 9.2 |
| Example 6 | 0.79 | 324 | Tough | Good | 8.9 |
| Example 7 | 0.75 | 329 | Tough | Good | 9.7 |
| Example 8 | 0.75 | 303 | Tough | Good | 12.5 |
| Example 9 | 0.71 | 298 | Tough | Good | 14.7 |
| Example 10 | 0.72 | 287 | Tough | Good | 13.9 |
| Comp. Example | 1.30 | 330 | Tough | Good | 1.2 |

As shown in Table 1, the polyimide resins prepared according to the present invention were all amorphous and transparent, and the inherent viscosity values measured by m-cresol were in the range of 0.7 to 0.9 dL/g. Further, the property of film prepared by solvent casting was also excellent. The resins herein showed high glass transition temperatures of higher than 290° C., which were found be controllable due to the fact that the glass transition temperature was indirectly proportional to the length of alkyl substituent.

The present has an advantage in that the polyimide resin with high molecular weight can be obtained by means of the one-step imidization method. Further, the polyimides manufactured according to the present invention showed the pretilt angles of 5~15° C. The pretilt angles as such were shown to be appropriate for the liquid crystal alignment layer for the Thin Film Transistor Liquid Crystal Display (TFT-LCD).

The polyimide resin under the present invention not only has superior heat-resistance but also excellent solubility and transparency, which could be applicable as a liquid crystal alignment layer for the TFT-LCD requiring a low temperature processing.

What is claimed is:
1. A soluble polyimide, having a dialkyl substituent, for a liquid crystal alignment layer, comprising a repetitive unit of formula (1):

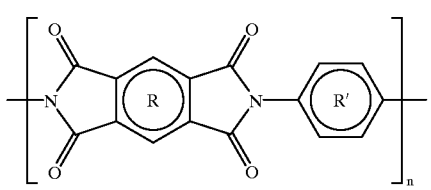

wherein

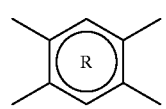

is a group of formula (3):

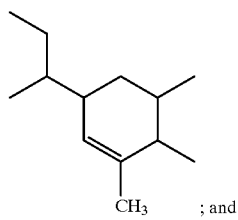
(3)

wherein

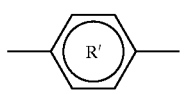

is a group of formula (2):

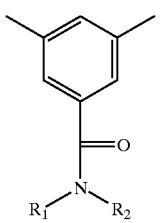
(2)

wherein $R^1$ and $R^2$ are selected from alkyl groups having from 4 to 18 carbon atoms; and wherein n is at least one.

2. A soluble polyimide according to claim 1, further comprising at least one

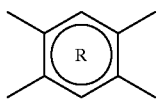

that is selected from:

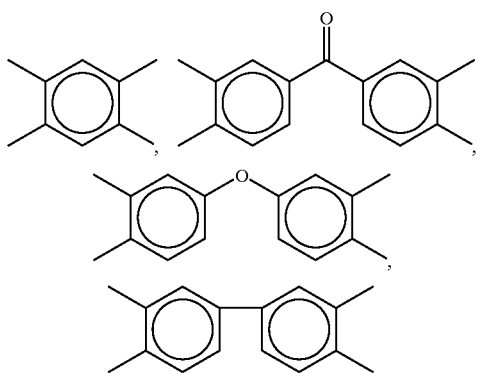

-continued

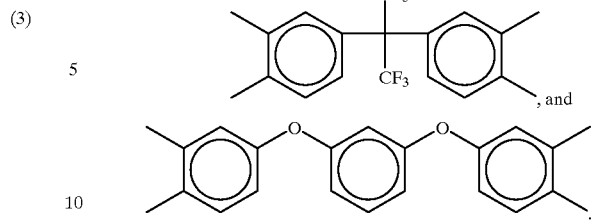

3. A soluble polymide resin according to claim 2, wherein the inherent viscosity of said soluble polymide resin has a value ranging from 0.5 to 2.0 dL/g.

4. A soluble resin according to claim 2, wherein the average molecular weight of said soluble polyimide resin has a value ranging from 50,000 to 150,000 g/mol.

5. A soluble polyimide resin according to claim 2, wherein the glass transition of temperature of said soluble polyimide resin has a value ranging from 250 to 400° C.

6. A soluble polyimide resin according to claim 2, wherein the pretilt angle of said soluble polyimide resin has a value ranging from 5° to 15°.

7. A polyimide resin according to claim 2, wherein said polyimide resin is soluble at room temperature in a mixture, wherein said mixture comprises at least two solvents selected from dimethylacetamide, dimethylformamide, N-methyl-2-pyrrolidone, tetrahydrofuran, chloroform, acetone, ethyl acetate, and m-cresol.

8. A soluble polyimide according to claim 1, further comprising at least one

that is selected from:

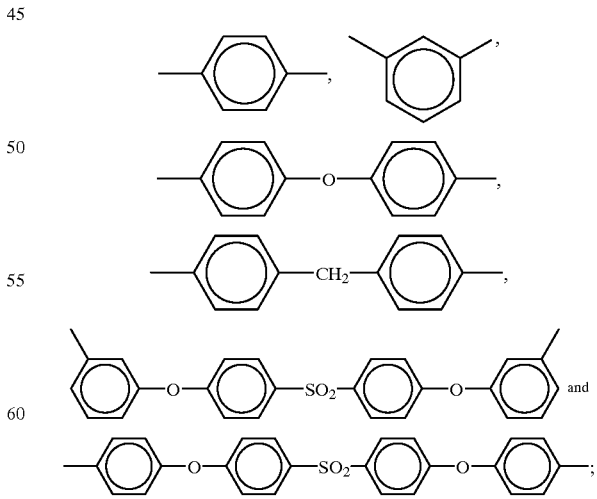

9. A soluble polyimide according to claim 3, further comprising at least one that is selected from:

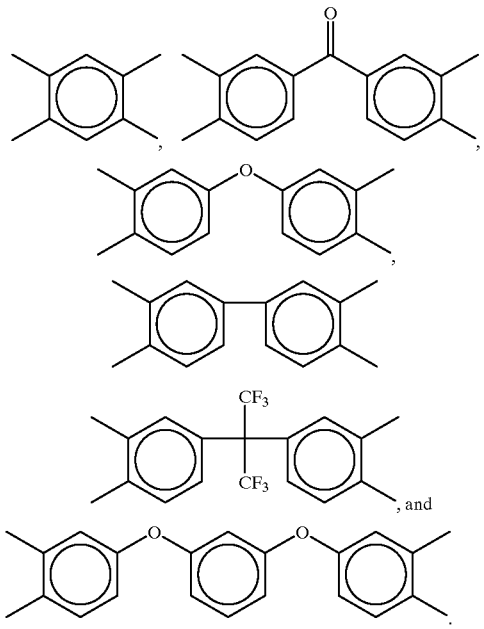

10. A soluble polymide resin according to claim 8, wherein the inherent viscosity of said soluble polymide resin has a value ranging from 0.5 to 2.0 dL/g.

11. A soluble resin according to claim 8, wherein the average molecular weight of said soluble polyimide resin has a value ranging from 50,000 to 150,000 g/mol.

12. A soluble polyimide resin according to claim 8, wherein the glass transition temperature of said soluble polymide resin has a value ranging from 250 to 400° C.

13. A soluble polyimide resin according to claim 8, wherein the pretilt angle of said soluble polyimide resin has a value ranging from 5° to 15°.

14. A polyimide resin according to claim 8, wherein said polyimide resin is soluble at room temperature in a mixture, wherein said mixture comprises at least two solvents selected from dimethylacetamide, dimethylformamide, N-methyl-2-pyrrolidone, tetrahydrofuran, chloroform, acetone, ethyl acetate, and m-cresol.

15. A soluble polymide resin according to claim 1, wherein the inherent viscosity of said soluble polymide resin has a value ranging from 0.5 to 2.0 dL/g.

16. A soluble resin according to claim 1, wherein the average molecular weight of said soluble polyimide resin has a value ranging from 50,000 to 150,000 g/mol.

17. A soluble polyimide resin according to claim 1, wherein the glass transition of temperature of said soluble polymide has a value ranging from 250 to 400° C.

18. A soluble polyimide resin according to claim 1, wherein the pretilt angle of said soluble polyimide resin has a value ranging from 5° to 15°.

19. A polyimide resin according to claim 1, wherein said polyimide resin is soluble at room temperature in a mixture, wherein said mixture comprises at least two solvents selected from dimethylacetamide, dimethylformamide, N-methyl-2-pyrrolidone, tetrahydrofuran, chloroform, acetone, ethyl acetate, and m-cresol.

* * * * *

UNITED STATES PATENT AND TRADEMARK OFFICE
CERTIFICATE OF CORRECTION

PATENT NO.    : 6,162,893                                      Page 1 of 1
DATED         : December 19, 2000
INVENTOR(S)   : Choi et al.

It is certified that error appears in the above-identified patent and that said Letters Patent is hereby corrected as shown below:

Column 11, line 65, column 13, line 24,
Insert -- , -- (a comma) after

" 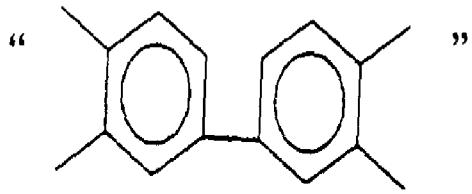 "

Column 12,
Line 62, ";" should read -- . --.

Signed and Sealed this

Eighteenth Day of June, 2002

Attest:

JAMES E. ROGAN
Attesting Officer                    Director of the United States Patent and Trademark Office